(12) United States Patent
Rakurty

(10) Patent No.: US 10,384,273 B2
(45) Date of Patent: Aug. 20, 2019

(54) HOLE SAW

(71) Applicant: The M. K. Morse Company, Canton, OH (US)

(72) Inventor: Chandra Sekhar Rakurty, Canton, OH (US)

(73) Assignee: The M.K. Morse Company, Canton, OH (US)

( * ) Notice: Subject to any disclaimer, the term of this patent is extended or adjusted under 35 U.S.C. 154(b) by 0 days.

(21) Appl. No.: 15/684,060

(22) Filed: Aug. 23, 2017

(65) Prior Publication Data
US 2018/0056405 A1 Mar. 1, 2018

Related U.S. Application Data

(60) Provisional application No. 62/378,756, filed on Aug. 24, 2016.

(51) Int. Cl.
| | |
|---|---|
| *B23B 51/05* | (2006.01) |
| *B23B 51/04* | (2006.01) |
| *B23D 63/20* | (2006.01) |
| *B23D 61/02* | (2006.01) |
| *B28D 1/04* | (2006.01) |

(52) U.S. Cl.
CPC ........ *B23B 51/0406* (2013.01); *B23D 61/021* (2013.01); *B23D 63/201* (2013.01); *B28D 1/041* (2013.01); *B23B 2251/28* (2013.01); *B23B 2251/285* (2013.01); *B23B 2251/428* (2013.01)

(58) Field of Classification Search
CPC . B23B 2251/14; B23B 51/0406; B23B 51/05; B23B 51/04; B23B 2251/28; Y10T 408/895; Y10T 408/8957; Y10T 408/896; B23D 61/021; B23D 61/121
See application file for complete search history.

(56) References Cited

U.S. PATENT DOCUMENTS

| | | | |
|---|---|---|---|
| 105,261 A | 7/1870 | Shailer | |
| 2,473,077 A | 6/1949 | Starbuck | |
| 2,779,361 A | 1/1957 | McKiff | |
| 3,292,674 A | 12/1966 | Turner | |
| 4,423,553 A | 1/1984 | Miyawaki | |
| 5,451,128 A | 9/1995 | Hattersley | |
| 5,803,678 A * | 9/1998 | Korb | B23B 51/0426 408/206 |

(Continued)

FOREIGN PATENT DOCUMENTS

GB 2353744 A 3/2001

*Primary Examiner* — Nicole N Ramos
(74) *Attorney, Agent, or Firm* — Black, McCuskey, Souers & Arbaugh, LPA

(57) ABSTRACT

A hole saw blade comprises a substantially cylindrical body with a pair of sides extending substantially concentric to each other. The sides have an inner surface and an outer surface. A cutting edge extends from an end of the body. A plurality of teeth defines the cutting edge. The teeth are arranged in an alternating pattern in which a first tooth extends inwardly of a cylinder containing the inner surface a first inner distance. A second tooth is adjacent to the first tooth extends outwardly of a cylinder containing the outer surface a second outer distance. A third tooth is located adjacent the second tooth on an opposite side of the first tooth and that extends inwardly of the cylinder containing the inner surface a third inner distance greater than the first inner distance.

13 Claims, 5 Drawing Sheets

(56) References Cited

U.S. PATENT DOCUMENTS

| | | | |
|---|---|---|---|
| 6,158,324 A * | 12/2000 | Kullmann | B23D 61/021 |
| | | | 408/206 |
| 6,269,722 B1 * | 8/2001 | Hellbergh | B23D 61/121 |
| | | | 83/661 |
| 6,786,684 B1 | 9/2004 | Ecker | |
| 7,237,291 B2 | 7/2007 | Redford | |
| 7,658,576 B1 | 2/2010 | Buzdum et al. | |
| 8,052,356 B2 | 11/2011 | Singh | |
| 8,579,554 B2 | 11/2013 | Novak et al. | |
| 8,579,555 B2 | 11/2013 | Novak et al. | |
| 9,038,512 B2 | 5/2015 | Horiguchi et al. | |
| 9,162,299 B2 | 10/2015 | Kullmann et al. | |
| 9,248,518 B2 | 2/2016 | Elliston et al. | |
| 2003/0010177 A1 | 1/2003 | Cook et al. | |
| 2004/0255749 A1 * | 12/2004 | Hayden, Sr. | B23D 61/121 |
| | | | 83/788 |
| 2005/0257660 A1 * | 11/2005 | Hayden | B23D 61/121 |
| | | | 83/846 |
| 2009/0035082 A1 | 2/2009 | Singh | |
| 2012/0230788 A1 * | 9/2012 | Bozic | B23B 51/0406 |
| | | | 408/209 |

* cited by examiner

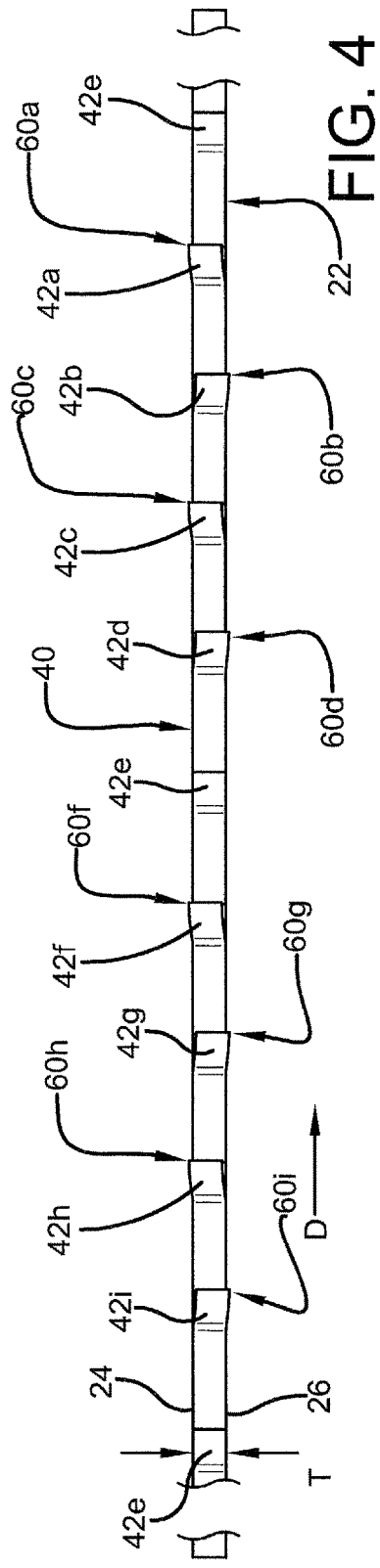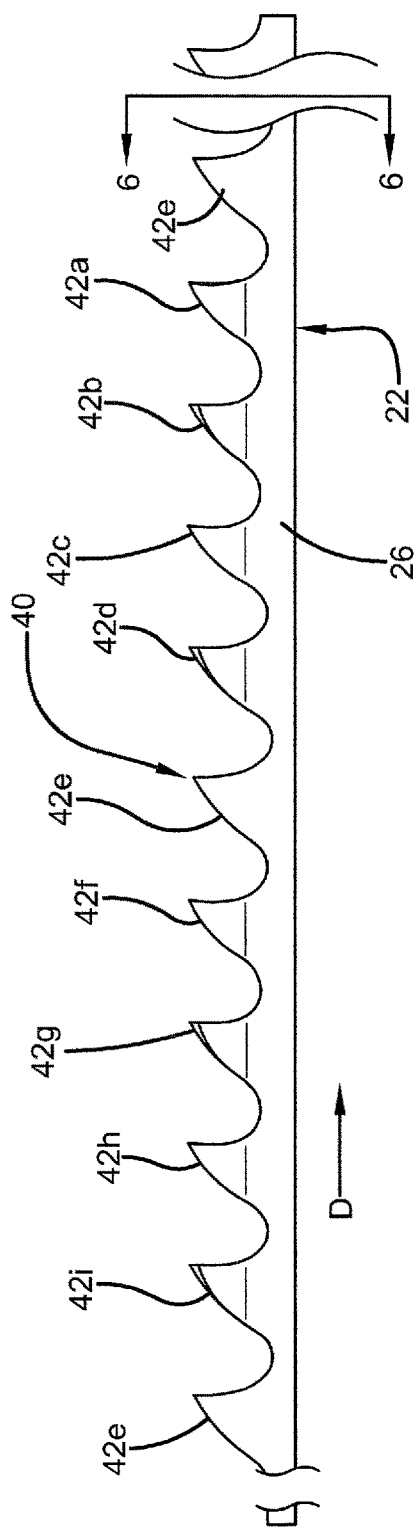

HOLE SAW

CROSS REFERENCE TO RELATED APPLICATION

This application claims the benefit of U.S. Provisional Patent Application Ser. No. 62/378,756, filed on Aug. 24, 2016.

TECHNICAL FIELD

The subject matter relates generally to cutting tools or implements having a cutting edge. In particular, the subject matter relates to cutting tools or implements, such as a hole saw, having teeth on the cutting edge arranged in a particular set pattern.

BACKGROUND

A hole saw is a type of cutting tool or implement used in forming circular holes in various materials, such as wood, metal, drywall, etc. The hole saw typically has a hollow and substantially cylindrical body. The cylindrical body has a pair of concentric side walls. A cutting edge with teeth is located at one end of the cylindrical body. A cap is typically located at the end of the body opposite the cutting edge. The cap may include threads, holes or other structure adapted to allow the hole saw to be drivingly connected to a drill, such as through an arbor or driver.

Teeth of the cutting edge are designed to cut a work piece during rotation of the cutting tool. In use, the circular cutting edge creates a circular hole in a work piece and, in turn, removes a cylindrical slug from the work piece. The teeth may all be contained within cylinders extending from the pair of concentric side walls or have some or all of the teeth extending inwardly the same distance and/or outwardly the same distance. Every inwardly extending tooth and the inner side wall can contact and hold the slug in the hole saw and can require a relatively large application of force to remove the slug. Typically, after the hole is cut in the work piece, the slug is retained within the hollow interior of the hole cutter and must be removed prior to cutting another hole. The slug removal process is often difficult and time consuming.

Prior art hole saws may include apertures or slots formed in the side walls of the hole saw body to pry against in order to force the slug from within the hole saw. A slug may still be difficult to extract from within the body of the hole saw even if it is equipped with slug removal apertures or slots. This is because the slug can become tightly wedged in the hole saw due to moisture, chips, removed and displaced material from the cut or other debris that can find their way between the inner side wall of the hole saw and the slug. The teeth that extend inwardly the same distance, if so equipped, may further exacerbate retention of the slug within the hole saw by engaging the outer surface of the slug.

Thus, there is a need for a hole saw blade that overcomes the disadvantages associated with slug removal from previously known hole saws. The hole saw according to the disclosed subject matter satisfies this need and overcomes the disadvantages, drawbacks and limitations of previously known hole saws.

SUMMARY

An improved hole saw cutting edge, according to an aspect of the disclosed subject matter, addresses slug formation and removal. The improved hole saw uses relatively fewer teeth extending inwardly than are present on previously known hole saws to form a slug. With relatively fewer inwardly extending teeth that engage and hold the slug within the hole saw, the slug may be extracted with relatively less effort than with previously known hole saws. Thus, the improved hole saw provides relatively easier removal of a slug from within the hole saw.

The hole saw includes a substantially cylindrical body with a pair of sides extending generally concentric to each other. The sides define an inner surface and an outer surface of the body of the hole saw. A cutting edge extends from an end of the body. A plurality of teeth forms the cutting edge. The teeth are arranged in a repeating and alternating or raker set pattern with a progressively increasing inside set. A first tooth extends a first inner distance inwardly of a cylinder containing the inner surface of the body. A second tooth is located adjacent to the first tooth and extends a second outer distance outwardly of a cylinder containing the outer surface of the body. A third tooth is located adjacent the second tooth opposite the first tooth and extends a third inner distance inwardly of the cylinder containing the inner surface. The third inner distance is greater than the first inner distance.

The hole saw may further include a fourth tooth that is located adjacent the third tooth on an opposite side from the second tooth and that extends a fourth outer distance outwardly of the cylinder containing the outer surface. The fourth outer distance is substantially equal to the second outer distance. The hole saw may further include another tooth located on a side of the fourth tooth opposite the third tooth and that extends a fifth inner distance inwardly of the cylinder containing the inner surface. The fifth inner distance is greater than the third inner distance.

The hole saw also may include another tooth located on a side of the fifth tooth opposite the fourth tooth and that extends a sixth outer distance outwardly of a cylinder containing the outer surface. The sixth outer distance is substantially equal to the second and fourth outer distances. The hole saw may yet include another tooth located on a side of the sixth tooth opposite the fifth tooth and that extends a seventh inner distance inwardly of a cylinder containing the inner surface. The seventh inner distance greater than the fifth inner distance. The cutting edge may also have at least one straight tooth that is substantially encompassed between the cylinders extending from the inner and outer surfaces. The straight tooth or teeth may be located anywhere along the cutting edge.

The hole saw may also include at least one opening extending through the sides of the body. The at least one opening is located and adapted to receive means to force a cut slug in a direction towards the cutting edge. The hole saw may further include a second opening extending through the sides of the body and axially spaced from the at least one opening. The second opening is located and adapted to receive means to force a cut slug in a direction towards the cutting edge.

DESCRIPTION OF THE DRAWINGS

At least one exemplary aspect of the disclosed subject matter is illustrated and described. The disclosed subject matter applies to non-limiting concepts and are set forth in the description and illustrated in the drawings in which similar reference numbers throughout the drawings refer to similar components and concepts, wherein:

FIG. 4 is an enlarged top view of a portion of the blank illustrated in FIG. 3 and taken approximately along line 4-4 of FIG. 3, illustrating exemplary relationships of teeth on a cutting edge of the hole saw;

FIG. 5 is an enlarged side elevational view of the portion of the blank illustrated in FIG. 4.

DETAILED DESCRIPTION

An improved hole saw, according to an aspect of the disclosed subject matter, is used for forming circular holes in various materials, such as metal, wood, composite, plastic, etc. The improved hole saw has a cutting edge that forms and creates a slug with relatively fewer inwardly extending teeth than exist on previously known hole saws. With fewer inwardly extending teeth that engage and hold the slug within the hole saw, the slug may be extracted with relatively less effort than with previously known hole saws. The cutting edge has some inwardly extending teeth of varied and progressively increasing set distances that are spaced apart in a repeating pattern.

Figure 1:
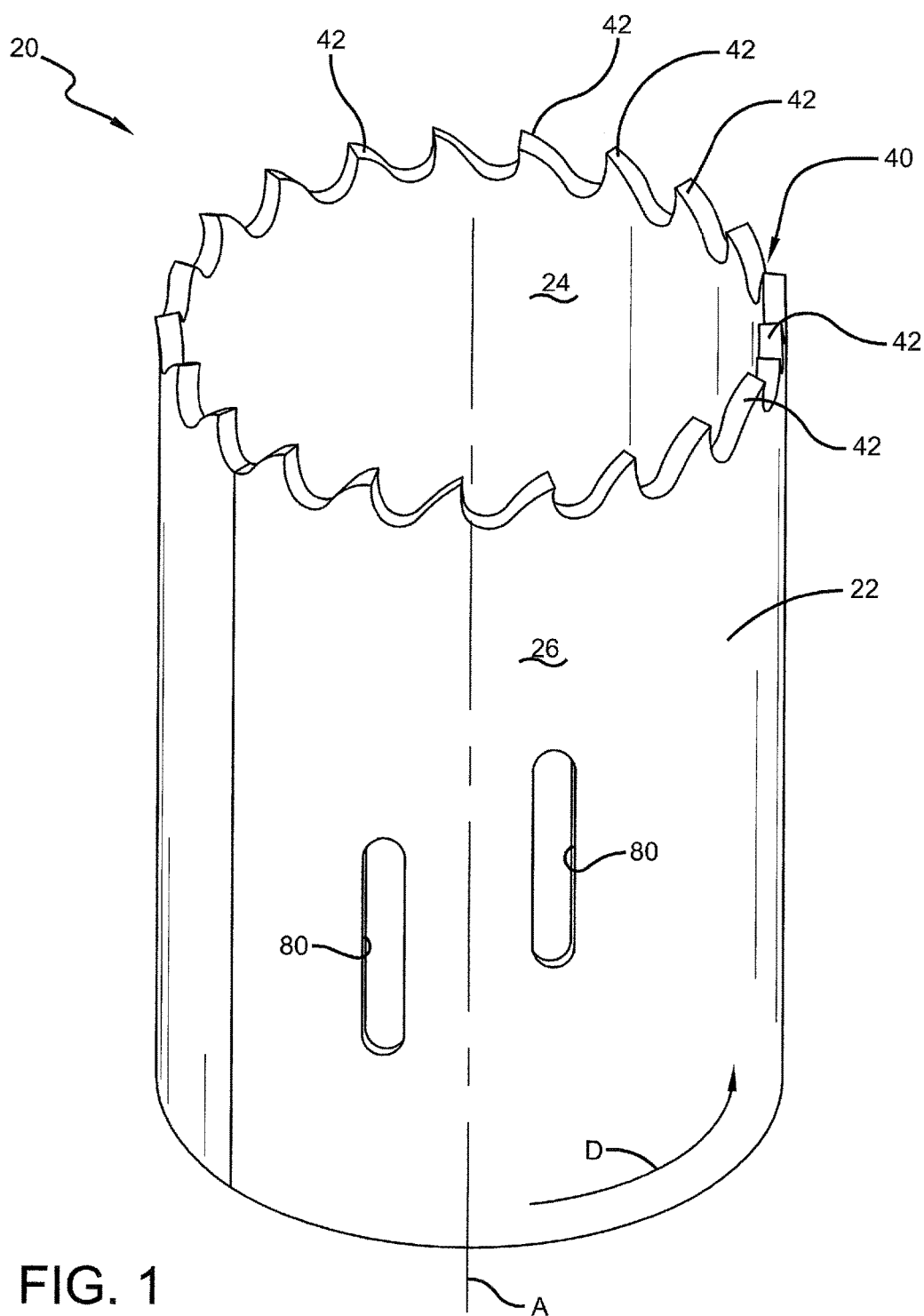
FIG. 1 is an overall perspective view of a hole saw according to an exemplary aspect.
Figure 2:
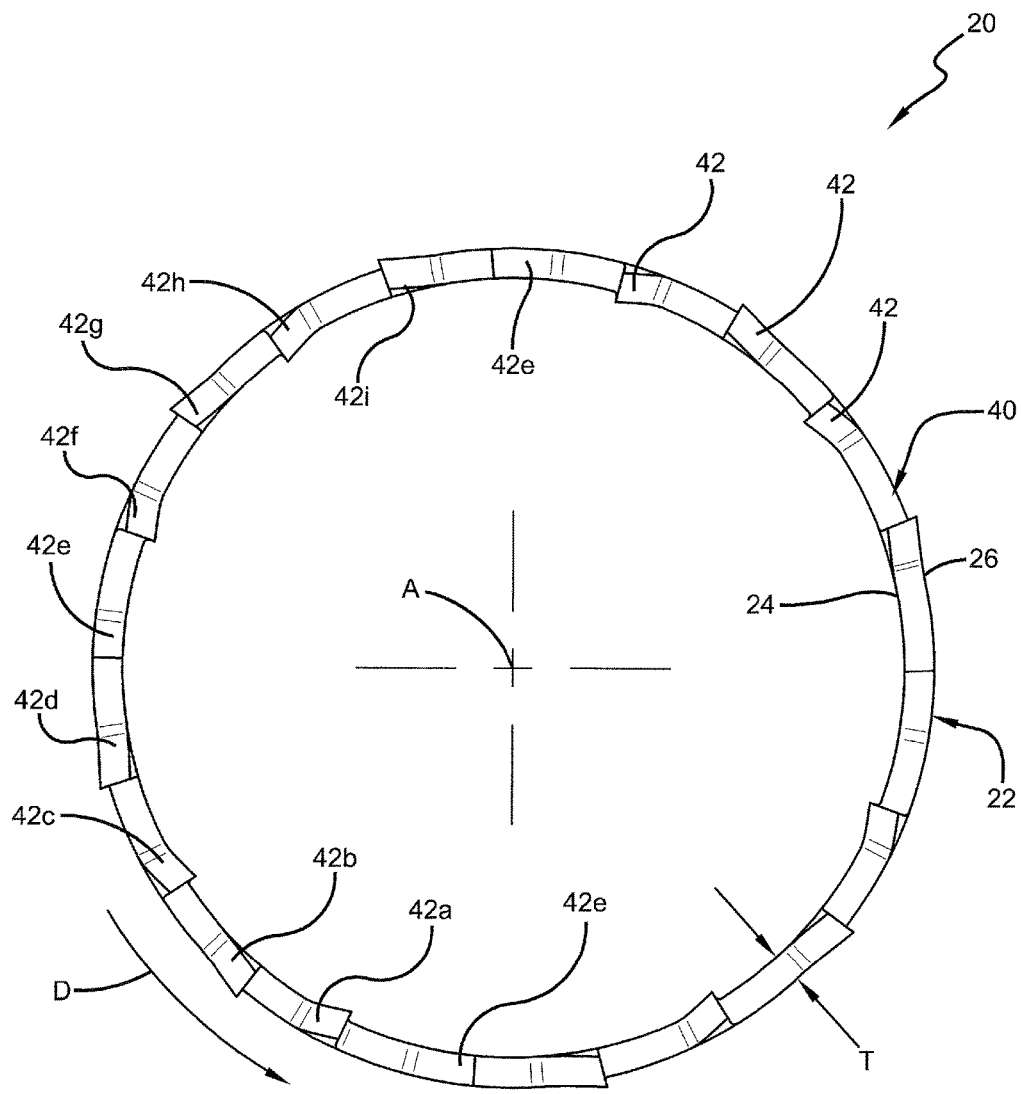
FIG. 2 is a top view of the hole saw of FIG. 1 illustrating exemplary relationships of teeth on a cutting edge of the hole saw.

An exemplary hole saw 20 (FIGS. 1 and 2), according to one aspect, has structure for forming a slug (not shown) that allows relatively easy removal of the slug from the hole saw. The hole saw 20 is designed to cut a workpiece during rotation of the hole saw in the cut direction D. In use, the hole saw 20 creates a circular hole in the workpiece and, in turn, creates a cylindrical slug from the work piece with an outer diameter slightly smaller than the inner diameter of the hole saw. Often, after the hole is cut in the workpiece, the slug is retained within the hole saw 20 and must be removed prior to cutting another hole.

The hole saw 20 has a substantially cylindrical body 22 with a hollow interior. The body 22 has a pair of cylindrical sides 24, 26 extending substantially concentric to each other. The side 24 defines an inner surface of the body 22 of the hole saw 20. The side 26 defines an outer surface of the body 22 of the hole saw 20. The body 22 is made from any suitable metal material, such as steel.

A cutting edge 40 extends from one end of the body 22. The cutting edge 40 forms a substantially annular area in the workpiece by removing material. Residual material inside the annular area forms the cylindrical slug. The inner and outer diameters of the cutting edge 40 may be of any suitable diameters. The hole saw 20 is often offered in a variety of different diameters to accommodate specific uses.

A metal cap (not shown) is typically located at the end of the body opposite the cutting edge 40. The cap would normally be fixed to the body 22 of the hole saw 20 by suitable means, such as welding. In some variations of the hole saw 20, the cap may be integrally formed with the body 22. The cap typically includes threads, holes or other structure adapted to allow the hole saw 20 to be drivingly connected to a power tool, for example a drill, through an arbor. It should be apparent that any suitable material may be used for the cap, such as steel. The hole saw 20 may include a pilot drill bit (not shown) and an arbor or driver attached to the cap, in a known manner.

The cutting edge 40 is defined by a plurality of teeth 42 arranged in a repeating and alternating raker set pattern with a progressively increasing inside set. By way of example, for a hole saw 20 that is intended to form a 1.5 inch or 2.0 inches diameter hole in materials, such as metal, wood, composite, plastic, etc., each of the teeth 42 has a tooth height H1 (FIG. 3) of about 0.13 inch. The pitch spacing for the teeth 42 can vary between five and six teeth per inch. The thickness T (FIG. 2) of the body 22 of the hole saw 20 is in the range of 0.045 inch to 0.055 inch, and preferably about 0.050 inch. A height H2 of the body 22 from its bottom as viewed in the FIG. 3 to the root of a tooth 42 is approximately 1.955 inch. The configuration of the teeth 42 of the cutting edge 40 may be altered depending on the material to be cut.

Figure 3:
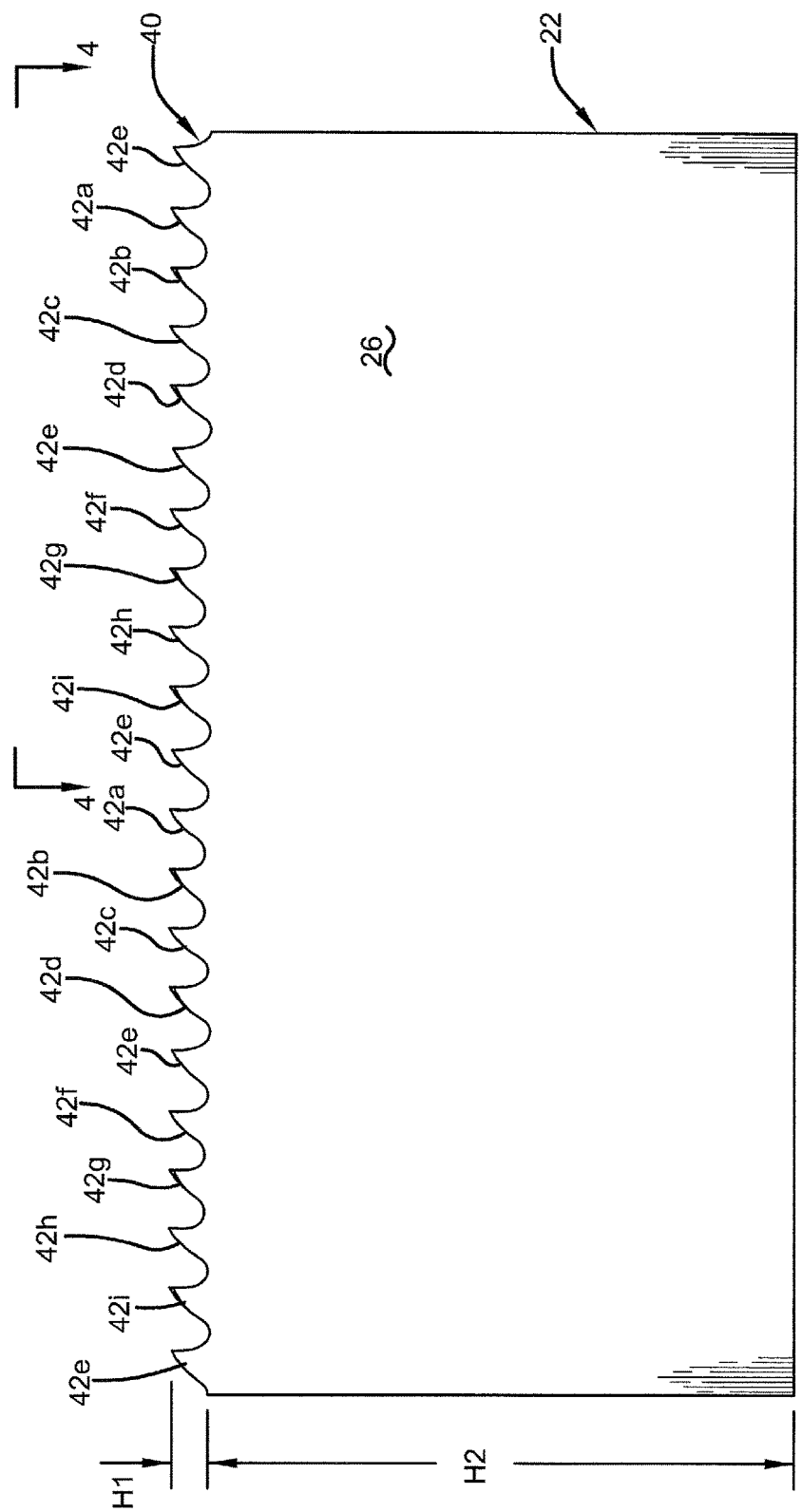
FIG. 3 is a side elevational view of a planar blank used to form a portion of the hole saw in FIG. 1.
Figure 6:
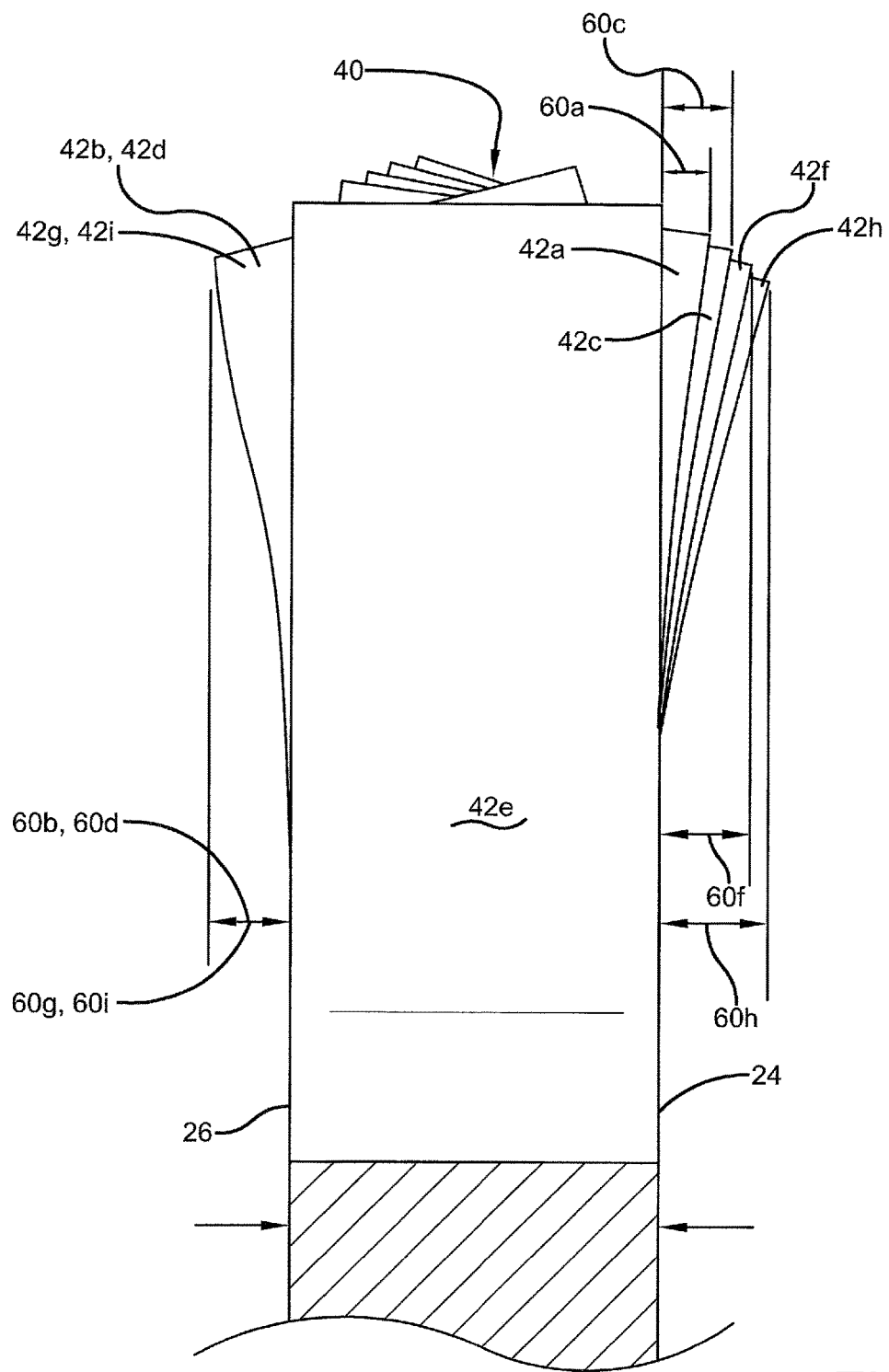
FIG. 6 is an enlarged cross-sectional view of the portion of the blank illustrated in FIG. 5 and taken approximately along line 6-6 of FIG. 5, illustrating the relationships of the teeth on the cutting edge of the hole saw from another direction.

A planar blank is illustrated in FIG. 3 that is used to form the body 22 of the hole saw 20. Features of the blank will be described for ease of understanding. The description equally applies to the cylindrical body 22 and both will be referred to interchangeably for the purposes of the disclosed subject matter. The teeth 42 are arranged in an alternating and repeating raker set pattern of inwardly set teeth, outwardly set teeth and straight or non-set teeth around the circumference of the cutting edge 40, best seen in FIGS. 2, 4 and 6. The set pattern is established during manufacturing by a mechanical deformation set process. The set pattern of the teeth 42 is repeated about the circumference of the cutting edge 40 of the hole saw 20. Adjacent teeth 42 may alternate in a repeating pattern among inwardly extending teeth, straight teeth and outwardly extending teeth. It is contemplated that the set pattern could be achieved by a ground set process.

For example, a first tooth 42a (FIGS. 2-6) in the set pattern of teeth 42 of the cutting edge 40 extends for a first inner distance 60a (FIG. 4) inwardly of a cylinder containing the inner surface 24 of the body 22. For exemplary purposes, the first inner distance 60a may be in the range from about 0.005 inch to about 0.010 inch, and preferably about 0.008 inch.

The cutting edge 40 of the hole saw 20 has a second tooth 42b in the set pattern that is located adjacent to the first tooth 42a in a direction opposite to the cut direction D. The second tooth 42b extends a second outer distance 60b in an opposite direction that the first tooth 42a extends and outwardly of a cylinder containing the outer surface 26. The second outer distance 60b may be in the range from about 0.010 inch to about 0.030 inch, preferably about 0.022 inch.

The cutting edge 40 of the hole saw 20 also includes a third tooth 42c that is located adjacent the second tooth 42b on an opposite side of the first tooth 42a. The third tooth 42c extends a third inner distance 60c inwardly of the cylinder containing the inner surface 24. The third inner distance 60c is greater than the first inner distance 42a. The third inner distance 60c is about equal to the first inner distance 60a plus an amount in the range of about 25% to about 100% of the first inner distance, and preferably about 50%. By way of example, the third inner distance may be in the range from about 0.010 inch to about 0.014 inch, and preferably 0.012 inch.

The cutting edge 40 of the hole saw 20 may include a fourth tooth 42d that is located adjacent the third tooth 42c on an opposite side of the second tooth 42b. The fourth tooth 42d extends a fourth outer distance 60d outwardly of the cylinder containing the outer surface 26. The fourth outer distance 60d is substantially equal to the second outer distance 60b. That is, the fourth outer distance 60d may be in the range from about 0.010 inch to about 0.030 inch, preferably about 0.022 inch.

The cutting edge 40 of the hole saw 20 may include another or fifth tooth 42e that may be located adjacent the fourth tooth 42d on an opposite side of the third tooth 42c. The fifth tooth 42e is formed so that it is located substantially between the planes or cylinders containing the inner surface 24 and the outer surface 26. That is, the fifth tooth 42e has no offset to either side relative to the body 22. The fifth tooth 42e is referred to as a straight tooth and removes a significant portion of material as the hole saw 20 advances during a hole cutting operation while the offset set teeth increase the kerf to allow the body 22 to pass through the cut workpiece easier. There are multiple straight teeth 42e that serve to increase the material removal thereby reducing the time it takes to cut a hole. Any suitable number of straight teeth 42e may be used in any location about the cutting edge 40 of the hole saw 20.

The cutting edge 40 of the hole saw 20 may include another or sixth tooth 42f that may be located adjacent the fifth tooth 42e on an opposite side from the fourth tooth 42d. The sixth tooth 42f may extend a sixth inner distance 60f inwardly of the cylinder containing the inner surface 24. The sixth inner distance 60f is greater than the third inner distance 60c and the first inner distance 60a. The sixth inner distance 60f is about equal to the third inner distance 60c plus an amount in the range from about 25% to about 100% of the first inner distance, and preferably about 50%. The inner distance 60f is in the range from about 0.014 inch about to 0.019 inch, and preferably about 0.016 inch.

The cutting edge 40 of the hole saw 20 may include another or seventh tooth 42g that may be located adjacent the sixth tooth 42f on an opposite side of the fifth tooth 42e. The seventh tooth 42g may extend a seventh outer distance 60g outwardly of the cylinder containing the outer surface 26. The outer distance 60g is substantially equal to the second outer distance 60b and fourth outer distance 60d. That is, the outer distance 60g is in the range from about 0.010 inch to about 0.030 inch, preferably about 0.022 inch.

The cutting edge 40 of the hole saw 20 may also include an eighth tooth 42h that is located adjacent the seventh tooth 42g on an opposite side from the sixth tooth 42f. The eighth tooth 42h may extend an inner eighth distance 60h inwardly of the cylinder containing the inner surface 24. The eighth inner distance 60h is greater than the sixth inner distance 60f, the third inner distance 60c and the first inner distance 60a. The eighth inner distance 60h is about equal to the sixth inner distance 60f plus an amount in the range from about 25% to about 100% of the first inner distance 60f, and preferably about 50%. The eighth inner distance 60h is in the range from about 0.018 inch to about 0.025 inch, preferably about 0.020 inch.

The cutting edge 40 of the hole saw 20 may further include a ninth tooth 42i located adjacent the eighth tooth 42h on an opposite side from the seventh tooth 42g. The ninth tooth 42i may extend an outer distance 60i outwardly of the cylinder containing the outer surface 26. The outer distance 60i is substantially equal to the second outer distance 60b, the fourth outer distance 60d and seventh outer distance 60g. That is, the ninth outer distance 60i is in the range from about 0.010 inch to about 0.030 inch, preferably about 0.022 inch.

The hole saw 20 with this repeating and alternating offset or set relationship of the teeth 42 progressively increasing inner distances 60a, 60c, 60f, 60h of the inwardly extending teeth 42a, 42c, 42f, 42h provides improved performance and relatively easy slug removal over previously known hole saws. The inner distances 60a, 60c, 60f, 60h progressively increase in a direction opposite to the cut direction D from a previous inner distance by a factor in the range from about 25% to about 100% of the first inner distance, and preferably 50% of the first inner distance. For example, using the preferred 50% progressive increase and starting with the first inner distance 60a as 0.008 inch, the third inner distance would be 0.012, the sixth inner distance would be 0.016 and the eighth inner distance would be 0.020. The hole saw 20 provides a relatively easier removal of a slug that is located within the body 22 because only every ninth tooth 42h, in the exemplary aspect, contacts and holds the slug in the body. Whereas in prior art hole saws having teeth that extend inwardly the same distance, every inwardly extending tooth contacts and holds the slug in the hole saw. Less force is required to eject a slug from the hole saw 20 because there are fewer teeth 42h in holding contact with the slug.

Any suitable number of teeth 42 may be used in any configuration as long as the teeth extending inwardly of the body 22 progressively increase in the distance that they extend from the inner surface 24 of the body. Any suitable number of fifth or straight teeth 42e may be used and in any location, or variety of locations, in the pattern of teeth 42 of the cutting edge 40.

The hole saw 20 may include at least one opening or multiple openings 80 extending through the sides 24, 26 of the body 22. The opening or openings 80 are located and adapted to receive a tool to apply a force to move a slug in a direction towards the cutting edge 40. If two openings 80 are used, the openings may be axially and circumferentially offset in relation to one another. The opening or openings 80 provide a surface that the tool can engage for leverage to pry and cause a slug to move.

While the disclosed subject matter is illustrated and described as applying to a hole saw 20 constructed according to disclosed aspects, the disclosed subject matter may be altered for other types of cutting blades without changing the overall concept or operation of the disclosed subject matter. In addition, different combinations, spacing and order of teeth 42 in the set pattern of the cutting edge 40 could be employed without changing the overall concept or operation of what is contained in the disclosed subject matter, provided that there are inwardly extending teeth with a progressively increasing inside set distances. While the cutting edge 40 of the hole saw 20 is illustrated as having a raker set, it will be appreciated that the cutting edge may incorporate all types of sets, such as without limitation a modified (or double set) raker, variable pitch modified (or D-double set) raker, wavy and alternate set, ETS.

Materials other than those described can be incorporated without changing the overall concept or operation of what is contained in the disclosed subject matter. It is contemplated that hole saw 20 may be made of any material that is suitable for cutting without changing the overall concept or operation of the disclosed subject matter. It is also contemplated that the cutting edge 40 with progressively increasing offset to one or both sides may be employed on blades other than for a hole saw 20.

Also, teeth 42 of the cutting edge 40 could be customized with different tooth rake angles, flank angles, bevel angles and heights without changing the overall concept or operation of what is contained in the disclosed subject matter. Moreover, different tip pitches and materials for the teeth 42 are contemplated without changing the overall concept or operation of what is contained in the disclosed subject matter. Structures of the teeth 42, other than those shown and described herein, are contemplated without changing the overall concept or operation of what is disclosed.

The disclosed subject matter has been described and illustrated with reference to at least one specific aspect. It is understood that this description and illustration is by way of example and not by way of limitation. Potential modifications and alterations will occur to others upon a reading and understanding of the disclosed subject matter, and it is understood that the disclosed and claimed subject matter includes all such modifications and alterations and equivalents.

What is claimed is:

1. A hole saw comprising:
   a substantially cylindrical body having a pair of sides extending substantially concentric to each other, the sides having an inner surface and an outer surface;
   a cutting edge extending from an end of the body;
   a plurality of teeth defining the cutting edge, the teeth are arranged in an alternating pattern where a first tooth extends inwardly of a cylinder containing the inner surface a first inner distance;
   a second tooth adjacent to the first tooth extending outwardly of a cylinder containing the outer surface a second outer distance;
   a third tooth located adjacent the second tooth on an opposite side of the first tooth extending inwardly of the cylinder containing the inner surface a third inner distance greater than the first inner distance;
   a fourth tooth located adjacent the third tooth on an opposite side of the second tooth extending outwardly of the cylinder containing the outer surface a fourth outer distance substantially equal to the second outer distance; and
   a fifth tooth located on a side of the fourth tooth opposite the third tooth extending inwardly of the cylinder containing the inner surface a fifth inner distance greater than the third inner distance.

2. The hole saw of claim 1 further including a sixth tooth located on a side of the fifth tooth opposite the fourth tooth extending outwardly of a cylinder containing the outer surface a sixth outer distance substantially equal to the second and fourth outer distances, and further including a seventh tooth located on a side of the sixth tooth opposite the fifth tooth extending inwardly of a cylinder containing the inner surface a seventh inner distance greater than the fifth inner distance.

3. The hole saw of claim 2 wherein each of the inner distances progressively increase from a previous inner distance by a factor in the range of 25% to 100% of the first distance.

4. The hole saw of claim 2 wherein the first inner distance is in the range of 0.005 inch to 0.010 inch, the second outer distance is in the range of 0.010 inch to 0.030 inch, the third inner distance is in the range of 0.010 inch to 0.014 inch, the fifth inner distance is in the range of 0.014 inch to 0.019 inch, and the seventh inner distance is in the range of 0.018 inch to 0.025 inch.

5. The hole saw of claim 1 further including at least one opening extending through the sides of the body, the at least one opening located and adapted to receive a device to force a cut slug in a direction towards the cutting edge.

6. The hole saw of claim 1 wherein the cutting edge further includes at least one straight tooth that is substantially encompassed between the cylinders extending from the inner and outer surfaces.

7. A hole saw comprising:
   a body having a pair of sides, the sides having a first surface and an opposite second surface;
   a cutting edge extending from an end of the body;
   a plurality of teeth arranged in an alternating pattern where a first tooth extends to one side of the first surface a first distance;
   a second tooth adjacent to the first tooth extending in an opposite direction from the second surface a second distance;
   a third tooth located adjacent the second tooth on an opposite side of the first tooth extending from the first surface a third distance greater than the first distance;
   a fourth tooth located adjacent the third tooth on an opposite side of the second tooth extending from the second surface a fourth distance substantially equal to the second distance; and
   a fifth tooth located on a side of the fourth tooth opposite the third tooth and that extends from the first surface a fifth distance greater than the third distance.

8. The hole saw of claim 7 further including a sixth tooth located on a side of the fifth tooth opposite the fourth tooth extending from the second surface a sixth distance substantially equal to the second and fourth distances, and further including a seventh tooth located on a side of the sixth tooth opposite the fifth tooth extending from the first surface a seventh distance greater than the fifth distance.

9. The hole saw of claim 8 wherein the first distance is in the range of 0.005 inch to 0.010 inch, the second distance is in the range of 0.010 inch to 0.030 inch, the third distance is in the range of 0.010 inch to 0.014 inch, the fifth distance is in the range of 0.014 inch to 0.019 inch, and the seventh distance is in the range of 0.018 inch to 0.025 inch.

10. The hole saw of claim 8 wherein each of the distances from the first side progressively increases from a previous distance from the first side by a factor in the range of 25% to 100% of the first distance.

11. The hole saw of claim 7 wherein the cutting edge further includes at least one straight tooth that is substantially encompassed between the cylinders extending from the inner and outer surfaces.

12. A hole saw comprising:
   a substantially cylindrical body defining a center axis of rotation, having an inner surface and an outer surface;
   a plurality of teeth defining a cutting edge, the plurality of teeth arranged in a-pattern including a first group of teeth oriented at angles toward the center axis of rotation and a second group of teeth oriented at an angle away from the center axis of rotation intermixed with the first group;
   where the teeth angled away from the center axis of rotation are each oriented at substantially the same angle; and
   where the teeth angled toward the center axis of rotation are oriented with angles of increasing magnitude as compared to a prior tooth of the first group.

13. The hole saw of claim 12 including at least one straight tooth intermixed with each group of teeth.

* * * * *